United States Patent [19]

Berg et al.

[11] Patent Number: 5,755,569
[45] Date of Patent: May 26, 1998

[54] MEDIA FOR HEAT EXCHANGE COLUMNS IN REGENERATIVE THERMAL OXIDIZERS

[75] Inventors: Lawrence D. Berg, Tulsa; Christopher R. Harmon, Owasso, both of Okla.; Richard L. Shilling, Cat Springs, Tex.; Neil Yeoman, Merrick, N.Y.

[73] Assignee: Koch Engineering Company, Inc., Wichita, Kans.

[21] Appl. No.: 796,422

[22] Filed: Feb. 6, 1997

Related U.S. Application Data

[60] Provisional application No. 60/012,228 Feb. 26, 1996.

[51] Int. Cl.⁶ .................................................. F27D 17/00
[52] U.S. Cl. ...................... 432/181; 432/180; 432/179; 165/9.1; 165/9.2
[58] Field of Search ................................. 432/181, 180, 432/179; 165/9.3, 9.1, 9.2, 10

[56] References Cited

U.S. PATENT DOCUMENTS

| 3,870,474 | 3/1975 | Houston | 432/181 |
|---|---|---|---|
| 4,378,045 | 3/1983 | Balke et al. | 165/9.3 |
| 5,352,115 | 10/1994 | Klobucar | 432/181 |

*Primary Examiner*—Henry A. Bennett
*Assistant Examiner*—Jiping Lu
*Attorney, Agent, or Firm*—Shook, Hardy & Bacon L.L.P.

[57] ABSTRACT

A regenerative thermal oxidizer is provided with a combustion chamber and a plurality of heat transfer columns. Heat transfer media within the columns include solid surfaces which define vapor flow passages. To permit higher volumetric vapor flow rates nearer the combustion chamber, the passages are larger in cross-sectional area and the solid surfaces have less total surface area in those portions of the heat transfer media nearer the combustion chamber than in those portions away from the combustion chamber. The larger cross-sectional area of the passages and reduced area of the solid surfaces decreases the resistance to vapor flow and allows the passages to accommodate the higher volumetric flow rate of the vapor stream passing through the hotter portions of the heat transfer media. The relatively smaller cross-sectional area of the passages and increased area of the solid surfaces in that portion of the heat transfer media located away from the combustion chamber allows for more efficient heat transfer between the media and the vapor stream in those cooler portions of the heat transfer media.

24 Claims, 2 Drawing Sheets

MEDIA FOR HEAT EXCHANGE COLUMNS IN REGENERATIVE THERMAL OXIDIZERS

CROSS-REFERENCE TO RELATED APPLICATION

This application claims the benefit of U.S. Provisional application Ser. No. 60/012,228, filed Feb. 26, 1996.

BACKGROUND OF THE INVENTION

The present invention relates in general to regenerative thermal oxidizers, and, more particularly, to the heat exchange media used in the heat transfer columns in such regenerative thermal oxidizers.

Regenerative thermal oxidizers are commonly used to convert pollutants in a contaminated vapor stream into less harmful combustion products prior to discharge of the vapor stream to the environment. As one example, regenerative thermal oxidizers are used to remove volatile organic compounds present in vapor streams from paint spray booths so that the discharged vapor streams are in compliance with environmental regulations.

Regenerative thermal oxidizers include a combustion chamber in which oxidization of the pollutants occurs and typically include two or more heat transfer columns which increase the efficiency of the oxidation process by preheating the contaminated vapor stream through heat exchange between the hot combusted vapor stream and the relatively cool contaminated vapor stream. The contaminated vapor stream is preheated by passing it through a first heat transfer column which has previously been heated by heat transfer with the hot combusted vapor stream. While the contaminated vapor stream is passing through the first heat transfer column, the hot combusted vapor stream is being directed through a second heat transfer column to cause heating thereof. Over a period of time, the first heat transfer column will cool an appreciable amount because of heat transfer with the contaminated vapor stream. The contaminated vapor stream is then redirected to the second heat transfer column and the combusted vapor stream is returned to the first heat transfer column through manipulation of flow control valves. This cycling of the vapor streams between the first and second heat transfer columns is continually repeated so that the desired preheating of the contaminated vapor stream is maintained, with resulting increases in the process efficiency of the regenerative thermal oxidizer.

One problem with regenerative thermal oxidizers of the type described above, is the presence of residual contaminated vapor in the heat transfer column as it is being switched between contaminated vapor stream flow and combusted "clean" vapor stream flow. This residual contaminated vapor will then be picked up by the clean vapor stream and discharged to the atmosphere. In order to remove this residue of contaminated vapor from the heat transfer column, it is known to direct a purge gas through the heat transfer column and into the combustion chamber prior to introduction of the clean vapor stream into the heat transfer column. Typically at least three heat transfer columns are utilized in such systems with the contaminated vapor stream, clean vapor stream and purge gas each being directed through separate columns in an alternating fashion, thereby permitting continuous operation of the regenerative thermal oxidizer. An example of such a system employing specific heat transfer media in the heat transfer columns is disclosed in U.S. Pat. No. 5,352,115.

Various types of heat transfer media have been utilized in the types of regenerative thermal oxidizers described above, including ceramic saddle-shaped random packings and the structures disclosed in U.S. Pat. No. 5,352,115. The heat transfer media is dumped or stacked to a preselected depth in the column with the openings formed between or within the media providing passages for flow of vapor. These passages are substantially uniform along the length of the heat transfer columns and provide uniform resistance to vapor flow. One problem associated with this uniform resistance to vapor flow is that it fails to accommodate the changes in volumetric flow rates of the vapor streams as they flow along the columns. Because the vapor streams and the heat transfer media are both much hotter in the area near the combustion chamber than at the opposite end of the column, there is a significant temperature gradient between the ends of the heat transfer column. As the hot clean vapor stream travels from the hot to the cooler end of the column, it undergoes significant cooling with resulting decreases in volumetric flow rate and heat transfer. The cool contaminated vapor stream, on the other hand, undergoes significant heating and expansion as it travels from the cooler end to the hot end of the column, with resulting increases in pressure drop. The fixed cross-sectional area and/or the general uniformity of the passages thus decreases the performance of the heat transfer column as the vapor streams undergo these thermal expansions and contractions.

SUMMARY OF THE INVENTION

It is an object of this invention to provide a regenerative thermal oxidizer having reduced pressure drop through the heat transfer columns so that increased process capacity can be achieved.

It is also an object of this invention to provide, in the described regenerative thermal oxidizer, heat exchange media constructed and arranged such that those portions of the heat exchange media which are positioned closer to the higher temperatures of the combustion chamber have less resistance to vapor stream flow so that higher volumetric vapor stream flow rates can be more readily accommodated in the hotter portions of the heat exchange media.

It is another object of this invention to provide heat transfer media having larger vapor flow passages which present less solid surface area in the hotter portions of the heat exchange media to accommodate the higher volumetric flow rates of the expanding vapor stream as it is heated during passage through the heat exchange media in the direction of the combustion chamber.

It is a still further object of this invention to provide heat transfer media having vapor flow passages that decrease in cross-sectional area and present more solid surfaces in contact with the vapor in the cooler areas of the heat exchange media so that more efficient heat transfer is achieved as the contracting vapor stream passes through those cooler areas of the heat exchange media.

To accomplish these and other related objects of the invention, in one aspect the invention is directed to a regenerative thermal oxidizer comprising a combustion chamber and a plurality of heat transfer columns in fluid flow communication with the combustion chamber and having first ends adjacent the combustion chamber and opposed second ends. Heat transfer media is provided within the heat transfer columns and have solid surfaces which define vapor flow passages that permit vapor streams to flow between the first and second ends of the heat transfer columns. The heat transfer media are arranged such that the fluid flow resistance of the heat transfer media nearer the combustion chamber is less than the fluid flow resistance of the heat transfer media nearer the second ends of the heat transfer columns to accommodate greater volumetric flow rate of the vapor streams through the vapor flow passages nearer the combustion chamber. The heat transfer media can comprise monolithic blocks, random packing elements, structured packings, including combinations thereof or other suitable structures.

In another aspect, the invention is related to a process of operating the described regenerative thermal oxidizer having heat transfer media with less resistance to vapor flow at the hotter ends of the heat transfer columns. The method comprises the steps of: directing the contaminated vapor stream from the inlet line and through the first heat transfer column into the combustion chamber; oxidizing the pollutants in the contaminated vapor stream while in the combustion chamber to create a clean combusted vapor stream; removing the clean combusted vapor stream from the combustion chamber through the vapor flow passages in the second heat transfer column; causing heating of the heat transfer media in the second heat transfer column by heat exchange between the clean combusted vapor stream and the heat transfer media; removing the clean combusted vapor stream from the second heat transfer column through the outlet line; then redirecting the contaminated vapor stream from the inlet line to the second heat transfer column while redirecting the clean combusted vapor stream from the combustion chamber to the first heat transfer column; directing the contaminated vapor stream through the vapor flow passages of the second heat transfer column and causing heating of the contaminated vapor stream by heat exchange with the heat transfer media prior to entry of the contaminated vapor stream into the combustion chamber, the reduced resistance to vapor flow allowing for increased volumetric flow rate of the contaminated vapor stream as a result of said heating; and directing the contaminated vapor stream from the second heat transfer column into the combustion chamber.

BRIEF DESCRIPTION OF THE DRAWINGS

In the accompanying drawings which form a part of the specification and are to be read in conjunction therewith and in which like reference numerals are used to indicate like parts in the various views.

DESCRIPTION OF THE PREFERRED EMBODIMENT

Figure 1:
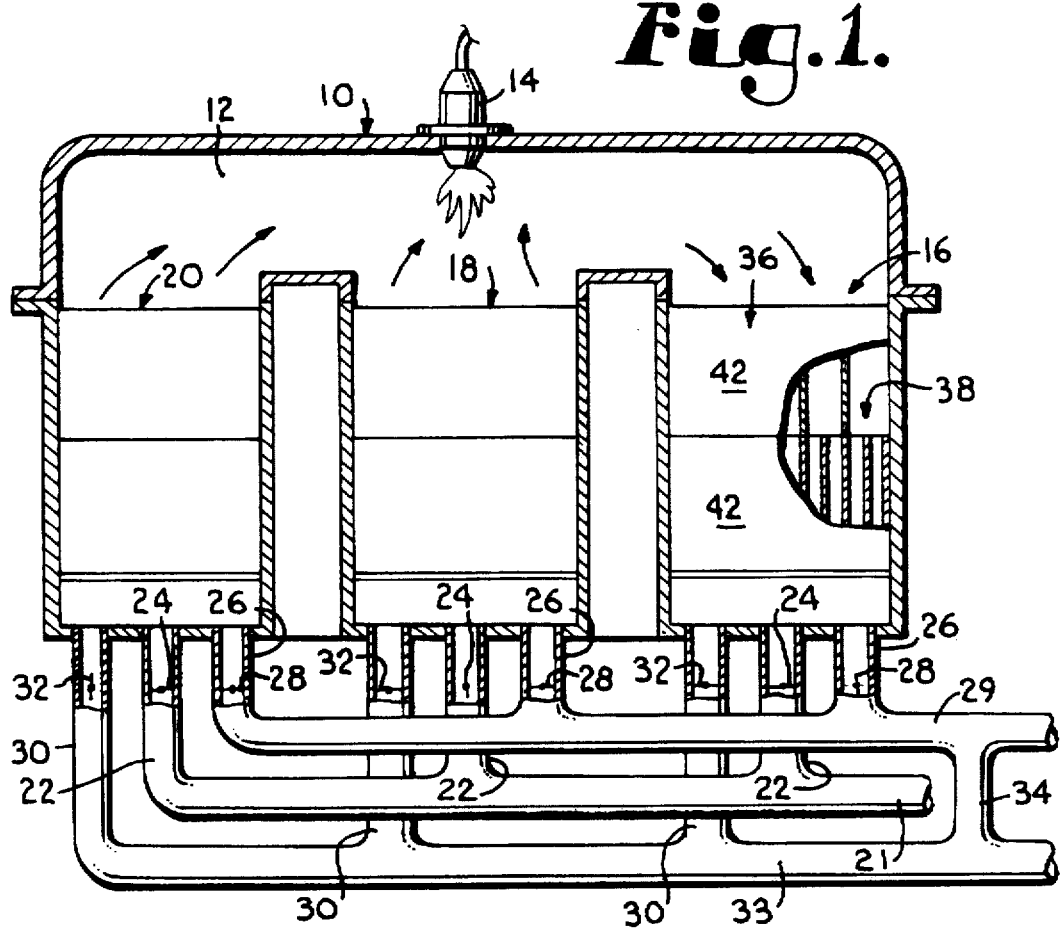
FIG. 1 is a fragmentary side elevation view of a regenerative thermal oxidizer constructed in accordance with the present invention and shown somewhat schematically.

Referring now to the drawings in greater detail and initially to FIG. 1, a regenerative thermal oxidizer is designated generally by the numeral 10 and is of the general type utilized to remove pollutants contained in a vapor stream by oxidizing them, and typically converting them into carbon dioxide and water. The regenerative thermal oxidizer 10 comprises a single combustion chamber 12 containing a burner 14 which causes oxidation of the pollutant-laden or contaminated vapor stream to form a clean vapor stream. The regenerative thermal oxidizer also includes three separate heat transfer columns 16, 18 and 20 which are in fluid flow communication with the combustion chamber 12 and through which the contaminated vapor stream and clean vapor stream alternately flow on their way to and from the combustion chamber.

The contaminated vapor stream may be directed from its source to each of the heat transfer columns 16, 18 and 20 through a supply line 21 and separate inlet lines 22 containing flow control valves 24. The clean vapor stream may be removed from the heat transfer columns by separate outlet lines 26 which also contain flow control valves 28 and feed a common discharge line 29. A purge gas may also be directed to the heat transfer columns through separate inlet purge lines 30 containing flow control valves 32 and connected to a common supply line 33. A portion of the clean vapor stream may be used as the source of the purge gas and a tap line 34 is provided between the clean vapor stream discharge line 29 and purge gas supply line 33 for this purpose.

The regenerative thermal oxidizer 10 as heretofore described operates in a generally known manner. The contaminated vapor stream flows through supply line 21 and is fed through inlet line 22 into the center heat transfer column 18. The contaminated vapor stream flows through the heat transfer column 18 and undergoes heat exchange before it enters the combustion chamber 12 where it is combusted to form the clean vapor stream. The clean vapor stream is removed from combustion chamber 12 through the adjacent heat transfer column 16 and is then removed from the column through outlet line 26 and discharge line 29. Purge gas is concurrently fed to the other heat transfer column 20 through supply line 33 and purge line 30. As the purge gas passes through the heat transfer column 20, it removes any contaminated vapor from the column 20 and carries it to the combustion chamber 12 for cleaning. The flow paths of the vapor streams as described above are regulated by selective opening and closing of the flow control valves 24, 28 and 32.

Because the clean vapor stream leaves the combustion chamber 12 at a high temperature, it is desirable to transfer heat from the clean vapor stream to the contaminated vapor stream to improve process efficiency. This is achieved by manipulating the flow control valves 24, 28 and 32 to cause the contaminated vapor stream to be redirected from heat transfer column 18 to the heat transfer column 16 which has been heated by the clean vapor stream. As the contaminated vapor stream flows through the heated column 16 it increases in temperature until it exits the column and enters the combustion chamber 12 at a much hotter temperature than when it entered the column. At the same time, the clean vapor stream is redirected from heat transfer column 16 to heat transfer column 20 which has been purged of contaminated vapor. The clean vapor stream enters heat transfer column 20 from combustion chamber 12 at a very high temperature and then exits the opposite end of the column 20 at a reduced temperature, having undergone heat exchange within the column 20. Purge gas is in turn directed through column 18 to remove residues of the contaminated vapor stream.

It will be appreciated that after a period of time, column 16 through which the contaminated vapor stream is flowing will have cooled as a result of heat exchange such that it does not provide the desired degree of preheating of the contaminated vapor stream. The contaminated vapor stream must then be switched to column 20 which has been heated by the clean vapor stream. The clean vapor stream is concurrently redirected to the purged heat transfer column 18 and purge gas is directed to the cooled column 16 to remove residue of the contaminated vapor stream. This repeated cycling of the vapor streams among the heat transfer columns allows the regenerative thermal oxidizer to be continuously operated while providing for indirect heat exchange between the respective vapor streams, as more fully described in U.S. Pat. No. 5,352,115, which is incorporated herein by reference in its entirety.

Figure 2:
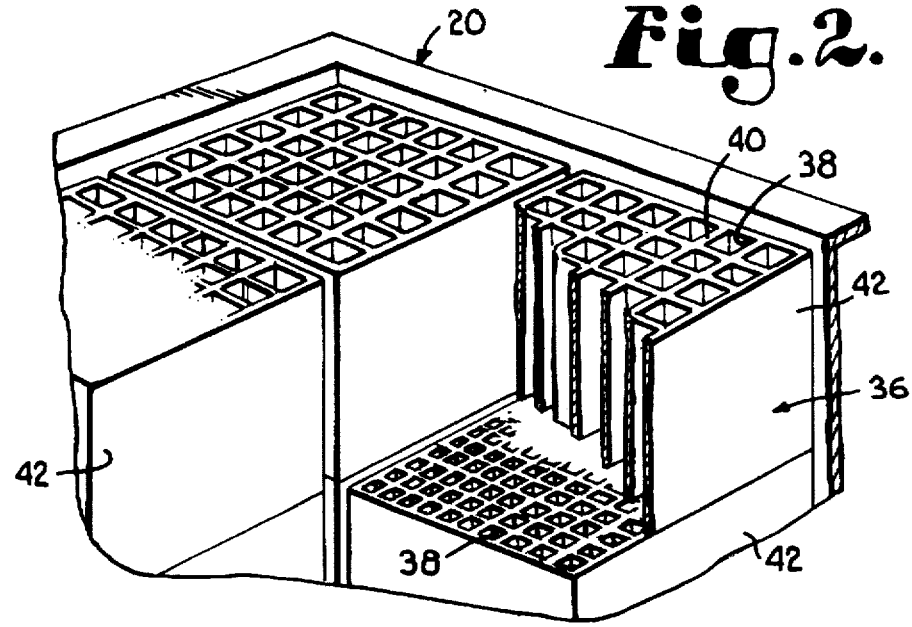
FIG. 2 is an enlarged fragmentary perspective view of one of the heat transfer columns used in the regenerative thermal oxidizer of FIG. 1 and showing the layers of heat exchange media used in the heat transfer column.

Turning additionally to FIG. 2, each of the heat transfer columns 16, 18 and 20 includes heat transfer media 36 formed of ceramic, metal or other suitable heat resistant, heat retaining materials. The heat transfer media 36 comprise vapor flow passages 38 which are permeable to vapor flow and solid surfaces 40 which provide heat transfer surfaces, and define the vapor flow passages. In accordance with the present invention, heat transfer media 36 positioned nearer the combustion chamber 12 have less resistance to vapor flow than heat transfer media positioned away from the combustion chamber 12. This arrangement can be achieved in any of various suitable ways and functions to accommodate the higher volumetric flow rate of vapor streams in the hotter areas of the columns 16, 18 and 20 nearer the combustion chamber 12. In general, resistance to vapor flow can be decreased by increasing the cross-sectional area of the vapor flow passages 38 and/or decreasing the surface area of the solid surfaces 40 which provide frictional resistance to vapor flow.

The particular heat transfer media 36 illustrated in FIGS. 1 and 2 comprise a plurality of monolithic blocks 42 having rectangular vapor flow passages 38 extending longitudinally between opposed ends of the blocks in the direction of the longitudinal axis of the associated heat transfer columns 16, 18 and 20. The blocks 42 are stacked side to side to fill the horizontal cross section of the heat transfer columns and two or more layers of such blocks 42 are positioned end to end to fill the desired longitudinal dimension within the columns. The layer of blocks 42 positioned nearest the combustion chamber 12 have vapor flow passages 38 which have a greater total cross-sectional area than the vapor flow passages 38 in the underlying layer of blocks positioned away from the combustion chamber. In addition, the solid surfaces 40 in heat transfer media 36 nearer the combustion chamber have significantly less total surface area than the solid surfaces 40 in the heat transfer media 36 away from the combustion chamber. This combination of increased area for passages 38 and reduced area for solid surfaces 40 decreases the resistance to vapor flow in the heat transfer media near the combustion chamber, thereby accommodating the increased volumetric flow rate of the heated vapor streams. It will be appreciated that the surface area of the solid surfaces can have a lessor or greater affect on the resistance to fluid flow than the cross-sectional area of the vapor flow passages.

Figure 3:
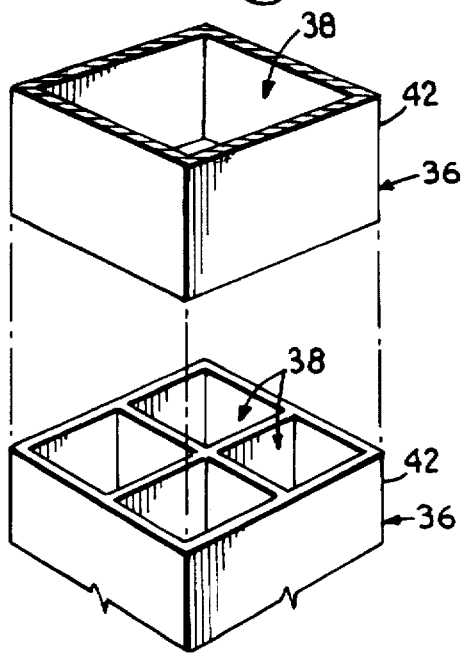
FIG. 3 is an exploded perspective view schematically illustrating the relationship between the vapor passages in a lower monolithic heat exchange media and the vapor passages in an upper monolithic heat exchange media.

The contacting ends of the two layers of blocks 42 form two types of junctions for the vapor flow passages 38, interfering and non-interfering. Interfering junctions are formed when the walls between the passages of one layer of blocks interfere with the passages of the adjacent layer of blocks. This would happen, for example, when the passages in the blocks nearer the combustion chamber have a pattern of five passages per inch by five passages per inch and the passages in the other layer of blocks have a pattern of eight per inch by eight per inch. In non-interfering junctions, all of the walls of the blocks nearer the combustion chamber would line up with some of the walls of the other layer of blocks. An example of this would be where the upper blocks have a passage pattern of four passages per inch by four passages per inch and the lower blocks have a passage pattern of eight passages per inch by eight passages per inch. Each larger passage 38 would thus feed four smaller passages 38 when the clean vapor stream is directed from the combustion chamber 12 through the associated heat transfer column. When the contaminated vapor stream is then passing through the heat transfer column and into the combustion chamber, the four smaller passages feed into one larger passage. This can be seen somewhat schematically in FIG. 3.

Although only two layers of blocks 42 have been illustrated, it is to be understood that more than two layers of blocks could be utilized if desired. The vapor flow resistance in the vapor flow passages in some adjacent layers of blocks can be the same as long as there is a decrease in flow resistance between at least two adjacent layers of blocks in the direction of the combustion chamber 12. Alternatively, the resistance can decrease in each successive layer of blocks in the direction of the combustion chamber. In addition, the shape and sizes of the vapor flow passages 38 can be varied as desired to suit particular applications.

Figure 4:
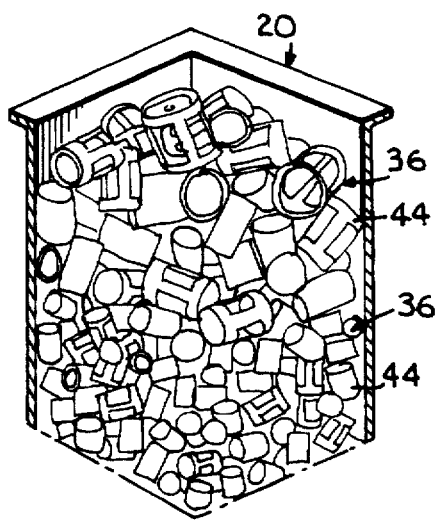
FIG. 4 is a fragmentary perspective view of the heat transfer column containing at least two layers of different sized ring-type random packing as the heat exchange media.
Figure 5:
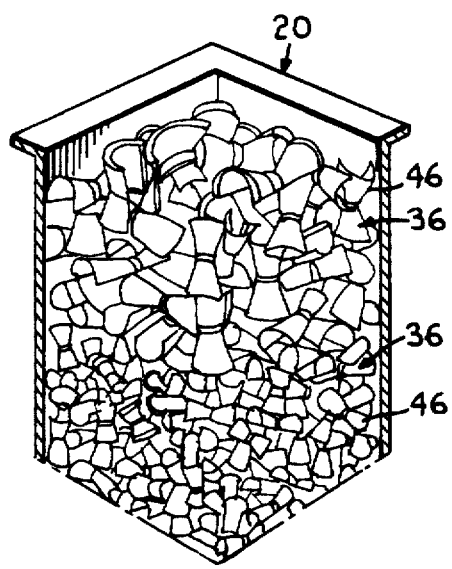
FIG. 5 is a fragmentary perspective view of the heat transfer column containing at least two layers of different sized saddle-shaped random packing as the heat exchange media.

Turning to FIGS. 4 and 5, the heat transfer media 36 can also compromise various types of random packing elements normally used in mass transfer columns. Ring-type random packing elements 44 depicted in FIG. 4 are commercially available in multiple sizes. These random packing elements 44 are normally of metal construction but the use of other materials is possible. Another type of random packing elements 46 shown in FIG. 5 are commonly referred to as saddles and are typically available in the following nominal sizes: ¾ inch, one inch, one and a half inches, two inches, and three inches. Saddles 46 are typically of ceramic construction but other types of materials such as metals can be used as well.

In order to obtain vapor flow passages 38 with greater total cross-sectional area and solid surfaces with reduced total surface in the region nearer the combustion chamber, a bed of larger sized random packing 44 or 46 is positioned adjacent the combustion chamber and another bed of smaller sized random packing 44 or 46 is positioned away from the combustion chamber. Each bed is created by simply placing the appropriately sized random packing to the appropriate depth in the heat transfer column. The upper bed of larger sized random packing may be placed directly on the lower bed of smaller sized random packing. It is not necessary that only one type of random packing elements 44 or 46 be used. In some applications it may be desirable to use multiple types of random packing elements or random packing elements in combination with other types of heat transfer media 36. In addition, more than two beds, regions or zones of heat transfer media may be used.

Figure 6:
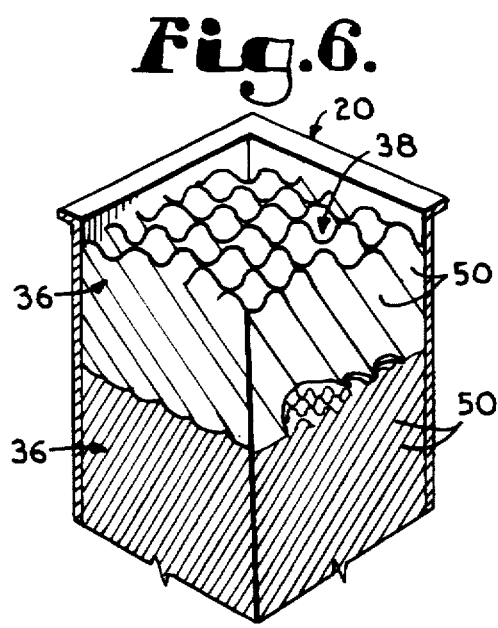
FIG. 6 is a fragmentary perspective view of the heat transfer column containing at least two layers of different sized corrugated structured packing as the heat exchange media.

Turning now to FIG. 6, it can be seen that structured packing elements such as corrugated sheets 48 can be used as the heat transfer media 36 and provide the desired variance in vapor flow resistance. Bundles of parallel corrugated sheets 48 having larger corrugation amplitudes are placed nearer the combustion chamber while bundles of parallel corrugated sheets 48 have smaller corrugation amplitudes are placed away from the chamber. The corrugations in the sheets 48 create the vapor flow passages 38, with the smaller lower passages feeding into the larger upper passages. The corrugated sheets 48 can be of metal or ceramic construction and can include apertures to facilitate lateral distribution of the vapor streams as they pass longitudinally through the heat transfer columns. Again, more than two layers of packing elements can be used if desired.

Other types of heat transfer media can be used in place of or in combination with the heat transfer media described herein, provided that the heat transfer media nearer the combustion chamber have less resistance to vapor flow than the media located away from the chamber. As discussed above, when different sizes of heat transfer media having the same general shape are used throughout the columns, this can be achieved by increasing the vapor flow passage area and/or decreasing the solid surfaces 40 area, thereby allowing the increased volumetric vapor flow rates to be accommodated in the hotter portions of the columns while still achieving the desired heat transfer rates in the relatively cooler portions of the columns. As a result, the present invention achieves a notable increase in the performance efficiency of the regenerative thermal oxidizer 10.

It is to be understood that the placement of the combustion chamber 12 in relation to the heat transfer columns 16, 18 and 20 can be varied from the illustrated embodiment. For example, the combustion chamber 12 could be placed below or to either side of the heat transfer columns. When the combustion chamber is to one side of the columns the flow through the columns is generally horizontal. These embodiments are encompassed within the scope of the present invention.

In the above examples, as illustrated in FIGS. 2–6, the same general shape of media is used throughout each column. When any one general shape of heat transfer media is used throughout the columns, the resistance to vapor flow is primarily a direct function of the total surface area of the solid surfaces and an inverse function of the void volume within the heat transfer media. It will be understood, however, that this is not the only way to achieve the desired differences in resistance to vapor flow. For example, differences in the shape of the heat transfer media can have an even more dramatic affect on the vapor flow resistance. Other things being equal, the monolithic blocks in FIGS. 2 and 3 have less resistance to flow than the structured packing in FIG. 6, which has less resistance to flow than the random packings in FIGS. 4 and 5. With monolithic blocks and structured packing, each having the same total surface area of the solid surfaces (specific surface area) and void volume, the monolithic blocks would have less resistance to flow. The desired effect could be achieved with a combination of such media where the monolithic blocks are at the hot end and the structured packing is at the cold end of the columns. Likewise, a random packing of the same specific surface area and void volume as a structured packing or monolithic blocks could be used with either of the latter shapes, with the random packing at the cold end of the column and the monolithic blocks or structured packing at the hot end. While this might be somewhat of a mechanical challenge where the combustion chamber is above the columns, it would be quite practical where the firing chamber is below the columns or to the side of the columns.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A regenerative thermal oxidizer comprising:

a combustion chamber;

a plurality of heat transfer columns in fluid flow communication with the combustion chamber, said heat transfer columns having first ends and opposed second ends, the first ends being nearer the combustion chamber than the opposed second ends; and means within the heat transfer columns for defining vapor flow passages which permit vapor streams to undergo heat exchange and flow between the first and second ends of the heat transfer columns with the total resistance to vapor flow through the vapor flow passages nearer the combustion chamber being less than the total resistance to vapor flow through the vapor flow passages nearer the second ends of the heat transfer columns to accommodate greater volumetric flow rate of the vapor streams through the vapor flow passages nearer the combustion chamber.

2. The regenerative thermal oxidizer of claim 1, including inlet and outlet lines coupled with the heat transfer columns for selectively delivering a contaminated vapor stream to the heat transfer columns and removing a clean vapor stream from the heat transfer columns.

3. The regenerative thermal oxidizer of claim 2, including a purge inlet line coupled with the heat transfer columns for selectively delivering a purge gas to the heat transfer columns.

4. The regenerative thermal oxidizer of claim 2, wherein said means comprises at least first and second blocks having solid surfaces defining said plurality of said vapor flow passages extending between opposed ends of said blocks, said blocks being arranged end to end with vapor flow passages of the second block feeding into vapor flow passages of the first block, said first block being positioned nearer the combustion chamber than the second block and the surface area of the solid surfaces defining the vapor flow passages in the first block being less than the surface area of the solid surfaces defining the vapor flow passages in the second block.

5. The regenerative thermal oxidizer of claim 4, wherein said vapor flow passages extend longitudinally between said first and second ends of the heat transfer columns.

6. The regenerative thermal oxidizer of claim 5, wherein said solid surfaces are longitudinally extending walls which are generally rectangular in cross section and define rectangular vapor flow passages.

7. The regenerative thermal oxidizer of claim 6, wherein at least some of the walls of the first block are aligned with at least some of the walls of the second block.

8. The regenerative thermal oxidizer of claim 2, wherein said means comprises first and second beds of random packing elements having solid surfaces defining said vapor flow passages, said first bed being positioned nearer the combustion chamber than the second bed and the surface area of the solid surfaces defining the vapor flow passages in the first bed being less than the surface area of the solid surfaces defining the vapor flow passages in the second bed.

9. The regenerative thermal oxidizer of claim 2, wherein said means comprises at least first and second bundles of corrugated sheets of packing having a plurality of said vapor flow passages extending between opposed ends of said bundles, said bundles being arranged end to end with vapor flow passages of the second bundle feeding into vapor flow passages of said first bundle, said first bundle being positioned nearer the combustion chamber than the second bundle and the surface area of the sheets defining the vapor flow passages in the first bundle being less than the surface area of the sheets defining the vapor flow passages in the second bundle.

10. The regenerative thermal oxidizer of claim 2, wherein at least some of said heat transfer media are of ceramic construction.

11. The regenerative thermal oxidizer of claim 2, wherein at least some of said heat transfer media are of metal construction.

12. A regenerative thermal oxidizer comprising:

a combustion chamber containing a burner;

at least three heat transfer columns in fluid flow communication with the combustion chamber, said heat transfer columns having first ends adjacent the combustion chamber and opposed second ends;

means within the heat transfer columns for defining vapor flow passages which permit vapor streams to undergo heat exchange and flow between the first and second ends of the heat transfer columns with the total resistance to vapor flow through the vapor flow passages nearer the combustion chamber being less than the total resistance to vapor flow through the vapor flow passages nearer the second ends of the heat transfer columns to accommodate greater volumetric flow rate of the vapor streams through the vapor flow passages nearer the combustion chamber;

inlet and outlet lines coupled with the heat transfer columns for selectively delivering a contaminated vapor stream among the heat transfer columns and removing a clean vapor stream from the heat transfer columns; and a purge inlet line coupled with the heat transfer columns for selectively delivering a purge gas to the heat transfer columns.

13. The regenerative thermal oxidizer of claim 12, wherein said means comprises at least first and second blocks having solid surfaces defining a plurality of said vapor flow passages extending between opposed ends of said blocks, said blocks being arranged end to end with vapor flow passages of the second block feeding into vapor flow passages of the first block, said first block being positioned nearer the combustion chamber than the second block and the surface area of the solid surfaces defining the vapor flow passages in the first block being less than the surface area of the solid surfaces defining the vapor flow passages in the second block.

14. The regenerative thermal oxidizer of claim 13, wherein said vapor flow passages extend longitudinally between said first and second ends of the heat transfer columns.

15. The regenerative thermal oxidizer of claim 14, wherein said solid surfaces are longitudinally extending walls which are generally rectangular in cross section and define rectangular vapor flow passages.

16. The regenerative thermal oxidizer of claim 15, wherein at least some of the walls of the first block are aligned with at least some of the walls of the second block.

17. The regenerative thermal oxidizer of claim 12, wherein said means comprises first and second beds of random packing elements having solid surfaces defining said vapor flow passages, said first bed being positioned nearer the combustion chamber than the second bed and the surface area of the solid surfaces defining the vapor flow passages in the first bed being less than the surface area of the solid surfaces defining the vapor flow passages in the second bed.

18. The regenerative thermal oxidizer of claim 12, wherein said means comprises at least first and second bundles of corrugated sheets of packing having a plurality of said vapor flow passages extending between opposed ends of said bundles, said bundles being arranged end to end with vapor flow passages of the second bundle feeding into vapor flow passages of said first bundle, said first bundle being positioned nearer the combustion chamber than the second bundle and the surface area of the sheets defining the vapor flow passages in the first bundle being less than the surface area of the sheets defining the vapor flow passages in the second bundle.

19. The regenerative thermal oxidizer of claim 12, wherein at least some of said heat transfer media are of ceramic construction.

20. The regenerative thermal oxidizer of claim 12, wherein at least some of said heat transfer media are of metal construction.

21. A process for operating a regenerative thermal oxidizer comprising a combustion chamber containing a burner, at least first and second heat transfer columns containing heat transfer media having means for defining vapor flow passages with decreasing total resistance to vapor flow nearer the combustion chamber and in fluid flow communication with the combustion chamber, an inlet line for delivering a contaminated vapor stream containing pollutants to the heat transfer columns, and an outlet line for removing a clean combusted vapor stream from the heat transfer columns, said process comprising:

directing the contaminated vapor stream from the inlet line and through the first heat transfer column into the combustion chamber;

oxidizing the pollutants in the contaminated vapor stream while in the combustion chamber to create the clean combusted vapor stream;

removing the clean combusted vapor stream from the combustion chamber through the vapor flow passages in the second heat transfer column;

causing heating of the heat transfer media in the second heat transfer column by heat exchange between the clean combusted vapor stream and the heat transfer media;

removing the clean combusted vapor stream from the second heat transfer column through the outlet line;

redirecting the contaminated vapor stream from the inlet line to the second heat transfer column while redirecting the clean combusted vapor stream from the combustion chamber to the first heat transfer column;

directing the contaminated vapor stream through the vapor flow passages of the second heat transfer column and causing heating of the contaminated vapor stream by heat exchange with the heat transfer media prior to entry of the contaminated vapor stream into the combustion chamber, said decreasing resistance to vapor flow nearer the combustion chamber allowing for increased volumetric flow rate of the contaminated vapor stream as a result of said heating; and directing the contaminated vapor stream from the second heat transfer column into the combustion chamber.

22. A regenerative thermal oxidizer comprising:

a combustion chamber;

a plurality of heat transfer columns in fluid flow communication with the combustion chamber, said heat transfer columns having first ends and opposed second ends, the first ends being nearer the combustion chamber than the opposed second ends; and heat transfer media within the heat transfer columns and comprising at least first and second blocks having solid surfaces which define a plurality of vapor flow passages extending between opposed ends of said blocks to permit vapor streams to flow between the first and second ends of the heat transfer columns, said blocks being arranged end to end with vapor flow passages of the second block feeding into vapor flow passages of the first block, said first block being positioned nearer the combustion chamber than the second block and the surface area of the solid surfaces defining the vapor flow passages in the first block being less than the surface area of the solid surfaces defining the vapor flow passages in the second block, whereby the total resistance to vapor flow through the heat transfer media nearer the combustion chamber is less than the total resistance to vapor flow through the heat transfer media nearer the second ends of the heat transfer columns to accommodate greater volumetric flow rate of the vapor streams through the vapor flow passages nearer the combustion chamber; and inlet and outlet lines coupled with the heat transfer columns for selectively delivering a contaminated vapor stream to the heat transfer columns and removing a clean vapor stream from the heat transfer columns.

23. A regenerative thermal oxidizer comprising:

a combustion chamber;

a plurality of heat transfer columns in fluid flow communication with the combustion chamber, said heat transfer columns having first ends and opposed second ends, the first ends being nearer the combustion chamber than the opposed second ends; and heat transfer media within the heat transfer columns and comprising at least first and second beds of random packing elements having solid surfaces which define a plurality of vapor flow passages to permit vapor streams to flow between the first and second ends of the heat transfer columns, said first bed being positioned nearer the combustion chamber than the second bed and the surface area of the solid surfaces defining the vapor flow passages in the first bed being less than the surface area of the solid surfaces defining the vapor flow passages in the second bed, whereby the total resistance to vapor flow through the heat transfer media nearer the combustion chamber is less than the total resistance to vapor flow through the heat transfer media nearer the second ends of the heat transfer columns to accommodate greater volumetric flow rate of the vapor streams through the vapor flow passages nearer the combustion chamber; and inlet and outlet lines coupled with the heat transfer columns for selectively delivering a contaminated vapor stream to the heat transfer columns and removing a clean vapor stream from the heat transfer columns.

24. A regenerative thermal oxidizer comprising:

a combustion chamber;

a plurality of heat transfer columns in fluid flow communication with the combustion chamber, said heat transfer columns having first ends and opposed second ends, the first ends being nearer the combustion chamber than the opposed second ends; and heat transfer media within the heat transfer columns and comprising at least first and second bundles of corrugated sheets of packing having a plurality of a vapor flow passages extending between opposed ends of said bundles to permit vapor streams to flow between the first and second ends of the heat transfer columns, said bundles being arranged end to end with vapor flow passages of the second bundle feeding into vapor flow passages of said first bundle, said first bundle being positioned nearer the combustion chamber than the second bundle and the surface area of the sheets defining the vapor flow passages in the first bundle being less than the surface area of the sheets defining the vapor flow passages in the second bundle, whereby the total resistance to vapor flow through the heat transfer media nearer the combustion chamber is less than the total resistance to vapor flow through the heat transfer media nearer the second ends of the heat transfer columns to accommodate greater volumetric flow rate of the vapor streams through the vapor flow passages nearer the combustion chamber; and inlet and outlet lines coupled with the heat transfer columns for selectively delivering a contaminated vapor stream to the heat transfer columns and removing a clean vapor stream from the heat transfer columns.

* * * * *